US009906986B2

United States Patent
C K (10) Patent No.: US 9,906,986 B2
(45) Date of Patent: Feb. 27, 2018

(54) PRIORITIZING QOS FOR USER APPLICATIONS IN COMMUNICATION NETWORKS

(71) Applicant: Alcatel Lucent, Boulogne, Billancourt (FR)

(72) Inventor: Madhusudana C K, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 19 days.

(21) Appl. No.: 14/766,158

(22) PCT Filed: Jan. 9, 2014

(86) PCT No.: PCT/EP2014/050273
§ 371 (c)(1),
(2) Date: Aug. 6, 2015

(87) PCT Pub. No.: WO2014/121968
PCT Pub. Date: Aug. 14, 2014

(65) Prior Publication Data
US 2015/0373588 A1    Dec. 24, 2015

(30) Foreign Application Priority Data
Feb. 7, 2013    (IN) .............................. 360/DEL/2013

(51) Int. Cl.
*H04W 4/00*    (2009.01)
*H04W 28/24*    (2009.01)
(Continued)

(52) U.S. Cl.
CPC ......... *H04W 28/24* (2013.01); *H04L 41/5022* (2013.01); *H04L 61/1511* (2013.01); *H04W 72/10* (2013.01); *H04W 4/00* (2013.01)

(58) Field of Classification Search
CPC ....... H04W 4/00; H04W 72/10; H04W 28/24; H04L 41/5022; H04L 61/1511
See application file for complete search history.

(56) References Cited

U.S. PATENT DOCUMENTS

| 8,005,090 B2 * | 8/2011 | Nakamichi ......... H04L 41/5003 370/230 |
| 2007/0104205 A1 * | 5/2007 | Baik ................. H04L 29/12066 370/395.3 |

(Continued)

FOREIGN PATENT DOCUMENTS

| EP | 1 250 021 A1 | 10/2002 | |
| EP | 2645798 A1 * | 10/2013 | ............ H04W 72/10 |
| WO | WO 2012/052568 A1 | 4/2012 | |

OTHER PUBLICATIONS

International Search Report for PCT/EP2014/050273 dated May 02, 2014.

*Primary Examiner* — Andrew Lai
*Assistant Examiner* — Chuong M Nguyen
(74) *Attorney, Agent, or Firm* — Fay Sharpe, LLP (57) ABSTRACT

The present subject matter discloses a method for prioritizing QoS for user application in a communication network. In one implementation, a user defined domain name list (UDDL) message, where the UDDL message includes a UDDL comprising of domain names in a priority order is received. Further, the domain names specified in the UDDL are converted to obtain a modified UDDL, where the modified UDDL includes the domain names converted in a format recognizable by a home location register (HLR). Subsequently, a radio access bearer assignment message including the modified UDDL is sent to the HLR.

11 Claims, 3 Drawing Sheets

(51) Int. Cl.
   *H04L 12/24* (2006.01)
   *H04L 29/12* (2006.01)
   *H04W 72/10* (2009.01)

(56) References Cited

U.S. PATENT DOCUMENTS

2012/0099429 A1* 4/2012 Ludwig ................ H04L 43/028
   370/235
2014/0378130 A1* 12/2014 Mantynen ............... H04W 8/02
   455/433

* cited by examiner

PRIORITIZING QOS FOR USER APPLICATIONS IN COMMUNICATION NETWORKS

FIELD OF INVENTION

The present subject matter relates to communication networks and, particularly, but not exclusively, to quality of service for user applications in communication networks.

BACKGROUND

Advancement in communication technology has made it possible for a user to avail services like mobile TV, E-commerce, video calling, online gaming, multimedia applications, and the like, provided by a service provider over a communication network. Implementation of high speed network technologies has made it possible for service providers to offer such services to the user. The user, through various communication devices, such as laptops, computers, desktops, smart phones, PDA's, and the like, may enjoy the services offered by the service provider over one or more communication networks, such as Ethernet, wireless local area network (WLAN), local area network (LAN), and other similar networks. Such services provided by the service provider usually involve real-time data transfer over the communication network and may thus require high bandwidth for their entire duration of operation to ensure smooth operation.

Some applications and services however are delay sensitive and thus require certain minimum connection speed in order to function efficiently. For example, certain E-commerce transactions over the web are sensitive to network connection and require continuous connectivity to the network for successful completion of the transaction. To ensure that satisfactory services are provided to the user, the service provider adopts several measures to provide reasonable quality of service (QoS) to the user and may charge the user accordingly.

Typically, the service providers classify the users into different classes based on an agreement between the service provider and the user. Based on the class, the service provider may ascertain a minimum level of QoS for the user and provides the services accordingly. Ascertaining the minimum level of QoS provided by the service provider assures the user of certain minimum level of quality, such as connectivity speed as data traffic for the user is routed based on the level of QoS associated with the class of the user. For example, a user enlisted in a top priority class will be offered more bandwidth as the level of QoS associated with the user will be attributed by high bandwidth as compared to a user enlisted in a lower priority class.

Ascertaining different levels of QoS for users helps in efficient management and allocation of network resources, thereby considerably reducing delays in routing data traffic over the communication network. However, allocation of network resources, such as channel bandwidth, processor, and routers based on the classes associated with the user may affect the user's experience as certain user applications may not be able to obtain sufficient resources. For example, a user enlisted in the lower priority class might not be able to run some application that requires high bandwidth as the communication network may not be able to provide bandwidth higher than the bandwidth designated for the level of QoS associated with the lower priority class. Allocation of the network resources based on the class of the user may thus affect the flexibility in connection speed provided to the user as the communication network may not be able to offer more bandwidth than allocated to the user. The user may thus either have to frequently request the service provider for a change in the class or use applications having bandwidth requirement corresponding to the user's class. Frequent change in class of the user, however, may not be feasible for the service provider as it would require re-allocation of network resources which may be a cumbersome process.

SUMMARY

This summary is provided to introduce concepts related to prioritizing QoS based on user applications. This summary is not intended to identify essential features of the claimed subject matter nor is it intended for use in determining or limiting the scope of the claimed subject matter.

In one implementation, a method for prioritizing QoS for user application in a communication network is described. The method includes receiving a user defined domain name list (UDDL) message, where the UDDL message includes a UDDL comprising of domain names in a priority order. The method further includes converting the domain names specified in the UDDL to obtain a modified UDDL, where the modified UDDL includes the domain names converted in a format recognizable by a home location register (HLR). Subsequently, a radio access bearer assignment message including the modified UDDL is sent to the HLR.

In another implementation, a domain name system (DNS) server for prioritizing QoS for user applications in a communication system is described. The DNS server includes a processor and a user interaction module coupled to the processor. The user interaction module is configured to receive a user defined domain name list (UDDL) message from a communication device, where the UDDL message includes a UDDL determined by a user of the communication device. The DNS server further includes a conversion module coupled to the processor, the conversion module configured to convert the UDDL to a modified UDDL.

In another implementation, a home location register (HLR) for managing network resources for prioritizing QoS for user applications in a communication network is described. The HLR is configured to manage network resources based on a radio access bearer (RAB) assignment message, where the RAB assignment message includes a modified user defined domain name list (UDDL), and wherein the modified UDDL comprises domain names in a priority order.

In accordance with another implementation of the present subject matter, a computer-readable medium having embodied thereon a computer program for executing a method of prioritizing QoS for user application in a communication network is described. The method includes receiving a user defined domain name list (UDDL) message, where the UDDL message includes a UDDL comprising of domain names in a priority order. The method further includes converting the domain names specified in the UDDL to obtain a modified UDDL, where the modified UDDL includes the domain names converted in a format recognizable by a home location register (HLR). Subsequently, a radio access bearer assignment message including the modified UDDL is sent to the HLR.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The present subject matter relates to methods and systems for providing quality of service in communication networks. The methods can be implemented in various communication devices communicating through various communication networks. The communication devices that can implement the described method(s) include, but are not limited to, cellular phones, smart phones, personal digital assistants (PDAs), portable computers, desktop computers, wireless data cards, servers, and the like. The communication networks in which the described method(s) can be implemented include, but are not limited to, Code Division Multiple Access (CDMA) Global System for Mobile Communication (GSM) network, Universal Mobile Telecommunications System (UMTS) network, Wideband Code Division Multiple Access (W-CDMA) network, and the like. Although the description herein is with reference to the UMTS network, the methods and systems may be implemented in other communication networks, albeit with a few variations, as will be understood by a person skilled in the art.

In communication networks, a user may register with a service provider for using various communication services, such as telephonic services and messaging services. In addition, the service providers may further offer add-on services, such as Mobile TV, Multimedia streaming, voice over internet protocol (VoIP), video calling, E-commerce, location based services, and online gaming, that may involve high speed data transfer over a communication network. Typically, these services are delay sensitive and require high bandwidth to sustain efficient operation over the communication network. For example, live streaming of an event, such as a football match over the communication network may require certain minimum bandwidth to ensure continuous transmission of the event. A decrease in the bandwidth may cause an undue lag in live transmission of the event, thereby leading to degradation in quality of the service provided to the user. Similarly, lack of sufficient bandwidth may lead to disruption or loss in connection with the communication network, resulting in unsuccessful completion of any online transaction happening at the user end. Further, live streaming and online gaming might appear like a buffer and burst application, thereby reducing the quality of service desired by the user.

To ensure that acceptable Quality of Service (QoS) is delivered to the user, the service provider typically deploys certain measures to efficiently manage network resources. Generally, the service provider enlists users into certain classes associated with different levels of QoS, for example, based on QoS profiles negotiated with the user. Different QoS profiles offer different connectivity speeds to the users enlisted in the class. For example, data traffic from applications of these users may be routed according to the level of QoS associated with the class, for instance, same applications when used by users associated with different classes may take different time for downloading data.

However, classification of users into classes associated with different levels of QoS may at times lead to insufficient bandwidth for certain user applications, thereby affecting QoS provided to the users. For example, a class into which a user is classified might not offer sufficient bandwidth to support online gaming The user in such a case may experience disrupted service over the communication network and may not be satisfied with the degraded gaming experience due to insufficient bandwidth support. The user may thus shift to higher class, which however, may not be cost efficient for the user as the user may need to pay additional charges to the service provider even if the user is accessing only a single high bandwidth application.

In one conventional method of managing network resources for providing desired level of QoS to the user, data traffic for the user applications is classified into several classes and mapped to per hop behavior (PHB) groups associated with different levels of QoS. Mapping data traffic to PHB groups helps in managing network resources based on the data traffic from the user applications as opposed to managing network resources based on the class of user. Based on the PHB group, the data traffic from the user applications are routed accordingly at each node over the communication network. For example, in UMTS networks, the users are enlisted into different classes and different levels of QoS are associated with each class. The different levels of QoS have specific attributes, such as bandwidth, transfer delay, maximum bit rate, and guaranteed bit rates, exclusive to that particular level of QoS. Data traffic from user applications pertaining to specific class is mapped to equivalent PHB groups. Based on the mapping, data traffic from the user applications is routed over the network using network resources assigned to the PHB group, thereby providing efficient utilization of bandwidth.

However, managing network resources for routing the data traffic according to the PHB groups may not provide sufficient bandwidth for certain user applications as the bandwidth associated with the PHB group may not be sufficient for efficient operation of the user application. Moreover, the service provider needs to ensure that proper mapping of data traffic classes to equivalent the PHB groups is done and that proper router settings capable of routing data traffic according to the PHB group is done. Thus, conventional routers may not be compatible with handling the data traffic based on the PHB groups and may need to be modified thereby increasing the cost of implementation.

The present subject matter relates to prioritizing QoS for user applications in communication networks. In an embodiment of the present subject matter, method and system for prioritizing QoS for user applications is described. In one implementation, a user of a communication device registered with a service provider may avail several services provided by the service provider over a communication network. For instance, the user registered with a particular service provider may access various services, such as messaging, applications for e-commerce transactions, and search applications. In one implementation, the user may desire a certain level of QoS for each of the services based on one or more parameters, such as frequency of use by the user. For instance, if the user needs to access a search engine or a particular website, say a trading website very frequently, the user may then desire that access to these applications is provided to the user without any delay. The user in such a case may request the service provider to provide a highest level of QoS for such user applications such that these user applications get the highest priority for data traffic exchange. In one implementation, the user application may include any services availed by the user, such as availing services over internet, performing transactions, e-commerce trading, online gaming, Mobile TV, streaming music, and the like.

In one implementation, the user may request the service provider for prioritizing the applications based on domain names of the applications. For the purpose, the user may initially define a list of domain names, hereinafter referred to as a user defined domain name list (UDDL), comprising domain names for which the user desires high level of QoS. For example, the UDDL may comprise a list of e-commerce websites, for which the user may seek high level of QoS from the service provider. The user may then establish a connection to the communication network through one or more access points, such as a wireless router, a communication tower, a wifi hotspot, modems, and the like, for sending the UDDL to a server, such as a domain name system (DNS) server associated with the communication network.

Upon receiving user request, a front-end firewall present in the communication network authenticates whether the user is a valid subscriber of the services requested. Upon successful authentication of the user, the front-end firewall grants access to the services provided by the service provider. The UDDL may then be sent to the DNS server. In one implementation, the user may send the list as a short message service (SMS) to its service provider. In another implementation, the user may send an E-mail to the service provider requesting high level QoS for domain names mentioned in the UDDL. In yet another implementation, the user may request the service provider for high level QoS, for the domain names mentioned in the UDDL, over voice call.

On receiving the UDDL from the user, the DNS server may store the UDDL. In one implementation, the DNS server may be configured to convert or modify the domain names in the UDDL to their respective IP addresses. Further, the DNS server sends the modified UDDL, comprising of the IP addresses corresponding to the domain names enlisted in the UDDL, over an interface to a central server, such as a home location register (HLR). In one implementation, the HLR may be configured to allocate network resources, based on the modified UDDL, in order to provide desired level of QoS to the user. For the purpose, the HLR may be configured to perform a radio access bearer (RAB) assignment for managing the network resources. In one implementation, the RAB is used for carrying user data over the communication network, as would be understood by a person skilled in the art. The HLR may further update a router linked to the HLR for routing the data traffic from the user based on the modified UDDL.

Consequently, the HLR sends a RAB assignment message containing the allocation details of the network resources based on the modified UDDL to the router linked to the HLR. In one implementation, the router may be configured for routing the data traffic from the user applications based on the modified UDDL, thereby providing desired level of QoS to the user for the domain names requested by the user in the UDDL.

The present subject matter, thus ensures that a sufficient level of QoS for user applications is provided to the user availing services provided by the service provider. Further, present subject matter may be implemented over conventional routers available for communication networks thereby reducing the cost for managing network resources and eliminating re-configuration of routers every time the user wishes to change the level of QoS for user applications.

The described methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "system" encompasses logic implemented by software, hardware, firmware, or a combination thereof.

For a firmware and/or software implementation, the methodologies can be implemented with modules (e.g., procedures, functions, and so on) that perform the functions described herein. Any machine readable medium, tangibly embodying instructions, can be used in implementing the methodologies described herein. For example, software codes and programs can be stored in a memory and executed by a processing unit. Memory can be implemented within the processing unit or may be external to the processing unit. As used herein, the term "memory" refers to any type of long term, short term, volatile, nonvolatile, or other storage devices and is not to be limited to any particular type of memory or number of memories, or type of media upon which memory is stored.

In another firmware and/or software implementation, the functions may be stored as one or more instructions or code on a computer-readable medium. Examples include computer-readable media encoded with a data structure, and the computer-readable media encoded with a computer program. The computer-readable media may take the form of an article of manufacture. The computer-readable media includes physical computer storage media. A storage medium may be any available medium that can be accessed by a computer. By way of example, and not limitation, such a computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of the computer-readable media.

In addition to storage on the computer readable media, instructions and/or data may be provided as signals on transmission media included in a communication apparatus. For example, a communication apparatus may include a transceiver having signals indicative of instructions and data. The instructions and the data are configured to cause one or more processors to implement the functions outlined in the claims. That is, a system includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Further, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. Additionally, the words "connected" and "coupled" are used throughout, for clarity of the description and can include either a direct connection or an indirect connection.

Figure 1:
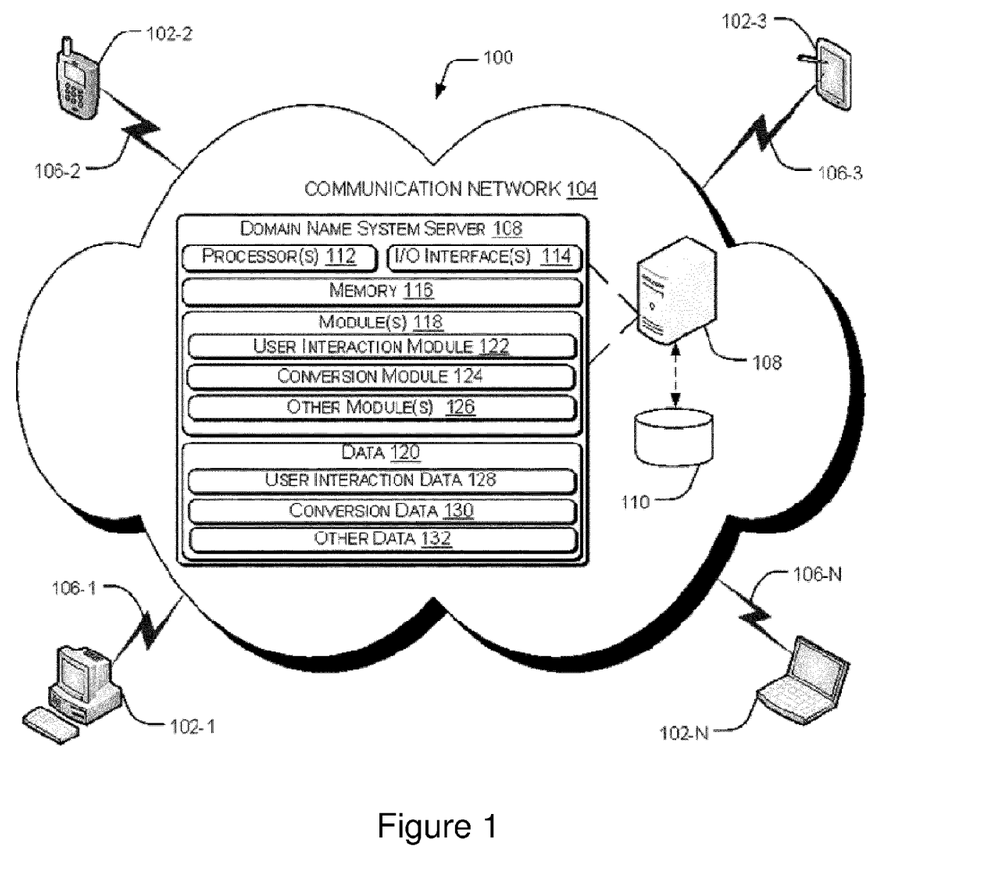
FIG. 1 illustrates an exemplary network environment implementation for prioritizing QoS based on user applications, according to an embodiment of the present subject matter.
Figure 2:
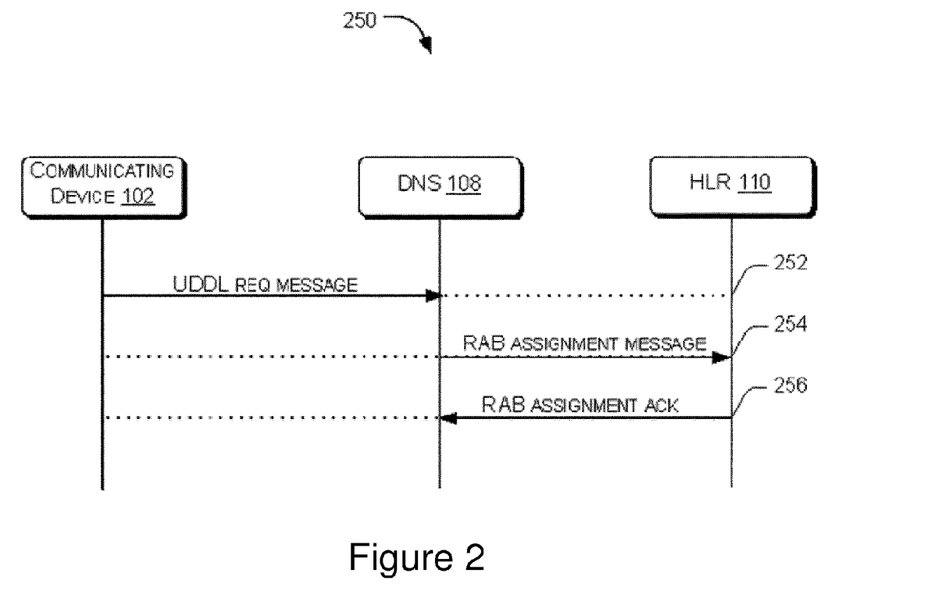
FIG. 2 is a call flow diagram indicating procedures for prioritizing QoS based on user application, in accordance with an embodiment of the present subject matter.
Figure 3:
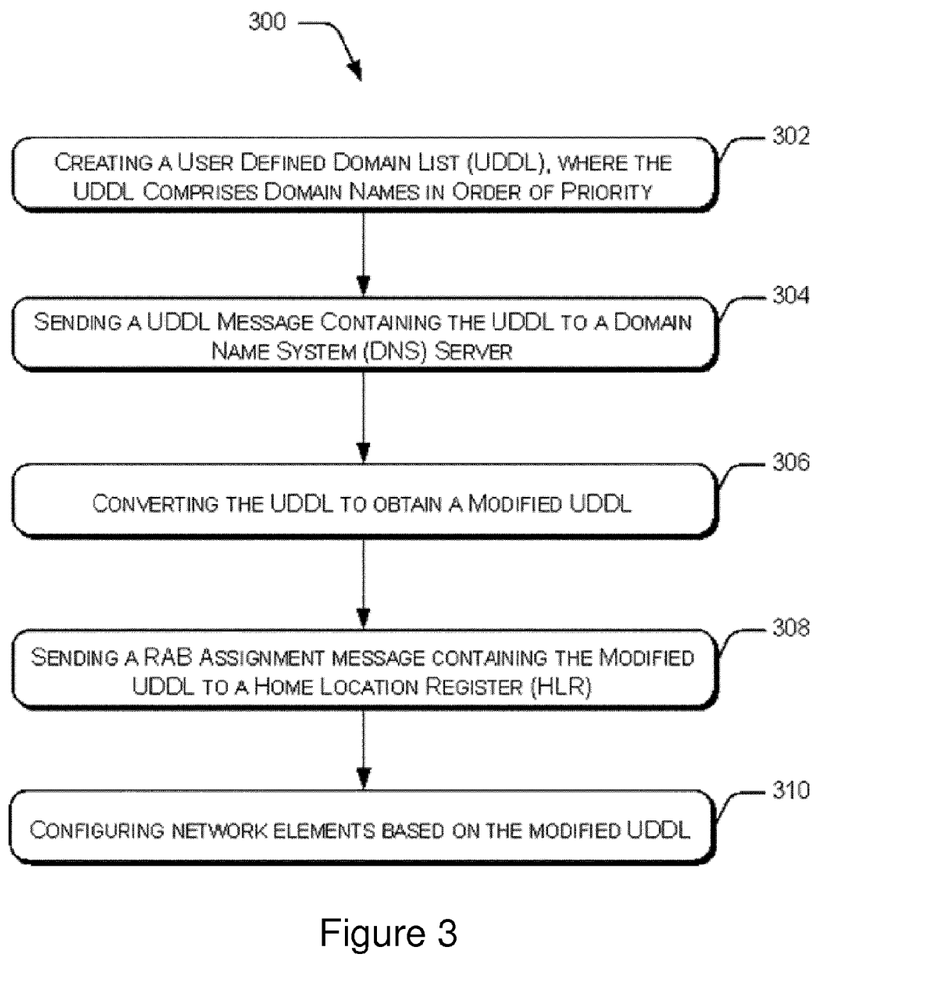
FIG. 3 illustrates a method for prioritizing QoS based on user application, in accordance with an embodiment of the present subject matter.

The manner in which the systems and the methods of prioritizing QoS for user applications shall be implemented has been explained in details with respect to the FIG. 1, FIG. 2, and FIG. 3. While aspects of described systems and methods for prioritizing QoS for user applications can be implemented in any number of different computing systems, transmission environments, and/or configurations, the embodiments are described in the context of the following exemplary system(s).

FIG. 1 illustrates a network environment 100 for prioritizing QoS for user applications. The network environment 100 includes one or more communication devices 102-1, 102-2, 102-3, ..., and 102-N, hereinafter collectively referred to as communication devices 102 and individually referred to as the communication device 102, connected to a communication network 104, according to an embodiment of the present subject matter.

The communication devices 102 may be defined as User Equipments (UEs) used by users to communicate with each other. Examples of the communication devices 102 may include, without limitation, mobile phones, landline phones, desktop computers, hand-held devices, laptops or other portable computers, network computers, and the like. Each of the communication devices 102 work on a communication protocol as defined by the communication network to which the communication device 102 is coupled.

The communication network 104 may be a wireless network, or a combination of wired and wireless network. The communication network 104 can be a collection of individual networks, interconnected with each other and functioning as a single large network (e.g., the internet or an intranet). Examples of such individual networks include, but are not limited to, 3rd Generation Partnership Project (3GPP), Long Term Evolution (LTE), and the like. Further, depending on the technology, the communication network 104 includes various network entities, such as gateways, routers; however, such details have been omitted for ease of understanding.

Further, the communication devices 102 are configured to interact with each other over the communication network 104 using network routed communication links 106-1, 106-2, 106-3, ..., 106-N.

The communication network 104 further comprises a domain name system (DNS) server 108 and a home location register (HLR) 110. In one implementation, the DNS server 108 may be configured to send a user defined domain name list (UDDL), received from a user of the communication device 102, to the HLR 110 for prioritizing domain names specified in the UDDL. Typically, the HLR 110 is responsible for managing the network resources for providing a quality of service (QoS) associated with the communication device 102. Based on the UDDL, the HLR 110 performs a radio access bearer (RAB) assignment for the communication device 102 for prioritizing the domain names specified in the UDDL, thereby ensuring smooth operation of the services requested by the user. Further, as described previously, the RAB is used for carrying user data over the communication network 104, as would be understood by a person skilled in the art.

For the purpose, the DNS server 108 includes one or more processor(s) 112, I/O interface(s) 114, and a memory 116 coupled to the processor(s) 112. The processor(s) 112 may be implemented as one or more microprocessors, microcomputers, microcontrollers, digital signal processors, central processing units, state machines, logic circuitries, and/or any devices that manipulate signals based on operational instructions. Among other capabilities, the processor(s) 112 are configured to fetch and execute computer-readable instructions stored in the memory 116.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The I/O interface(s) 114 may include a variety of software and hardware interfaces, for example, interfaces for peripheral device(s), such as data input output devices, referred to as I/O devices, storage devices, network devices, etc. The I/O device(s) may include Universal Serial Bus (USB) ports, Ethernet ports, host bus adaptors, etc., and their corresponding device drivers. The I/O interface(s) 114 facilitate the communication of the HLR 110 with various networks, such as the communication network 104 and various communication and computing devices, such as the communication devices 102.

The memory 116 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The DNS server 108 may also include various modules 118. The modules 118, amongst other things, include routines, programs, objects, components, data structures, etc., which perform particular tasks or implement particular abstract data types. The modules 118 may also be implemented as, signal processor(s), state machine(s), logic circuitries, and/or any other device or component that manipulate signals based on operational instructions.

Further, the modules 118 can be implemented in hardware, instructions executed by a processing unit, or by a combination thereof. The processing unit can comprise a computer, a processor, such as the processor 112, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 118 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The DNS server 108 may further include data 120, which amongst other things, serves as a repository for storing data processed, received, associated, and generated by one or more of the module(s) 118.

The module(s) 118 further include a user interaction module 122, a conversion module 124, and other module(s) 126. The other module(s) 126 may include programs or coded instructions that supplement applications and functions of the DNS server 108

The data 120 includes, for example, user interaction data 128, conversion data 130, and other data 132. The other data 132 includes data generated as a result of the execution of one or more modules in the other module(s) 126.

Typically, a service provider offers several services, such as mobile TV, internet services, online gaming, and several other services to a user over a communication network. The user may avail any of the services through a communication device registered with the service provider. Further, the communication device has a QoS profile associated with it based on a subscription plan availed by the user. For example, the communication device may have a class A QoS profile, based on the subscription plan availed by the user. In another example, the communication device may have a class B QoS profile. Each of the several classes of QoS profile offer different connectivity experience to the user. For instance, a communication device having class A QoS profile may have greater bandwidth allotted to it as compared to a communication device having class B QoS profile. Further, all traffic from various applications used by the user are serviced throughout the communication network according to the class of QoS profile associated with the communication device corresponding to the user.

According to an implementation of the present subject matter, a user of the communication device 102, registered with the service provider, may wish to prioritize certain domains for ensuring convenient browsing experience while accessing services over those domains. For example, the user may wish to prioritize certain banking domains for ensuring successful completion of online transactions. In another implementation, the user may wish to prioritize certain online gaming domains for ensuring smooth gameplay over these websites. In order to prioritize the desired domains, the user may define a user defined domain list (UDDL), where the UDDL comprises of the domain names which the user wishes to prioritize. For example, the user may enlist several websites, such as banking websites, shopping websites, online gaming websites, and the like, in the UDDL to ensure convenient browsing experience while surfing these websites. In one implementation, the user may define the domain list in descending order of priority, i.e., domains with topmost priority are provided at the top of the domain list. In another implementation, the user may divide the UDDL in different sections. For example, the user may divide the UDDL in three sections, such as high priority section, medium priority section, and low priority section. The user may enlist certain domains, such as banking websites, e-mail websites, and news websites in high priority section to ensure convenient browsing experience while accessing these websites. Similarly, the user may classify certain domains which are not frequently used in the low priority section.

Typically, for availing services offered by the service provider, the communication device 102 latches onto an access point of the communication network 104. Further, a firewall present in the communication network 104 performs the authentication check of the communication device 102 through a conventional authentication, authorization, and accounting (AAA) server. Upon successful authentication of the communication device 102, conventional tunnel establishment takes place for carrying user data, as would be understood by a person skilled in the art.

Subsequently, the user sends the UDDL to the service provider through the communication device 102. In one implementation, the user may send the UDDL through a short messaging service (SMS) message. In another implementation, the user may send the UDDL via an e-mail. In yet another implementation, the user may request for prioritizing the domain names enlisted in the UDDL over a voice call.

As described previously, the DNS server 108 may be configured to receive the UDDL sent by the user. In one implementation, the user interaction module 122 may be configured to receive the UDDL sent by the communication device 102. Further, the user interaction module 122 may be configured to store the UDDL in the user interaction data 128. In one implementation, the conversion module 124 may be configured to convert the UDDL into a format recognizable by the HLR 110. For the purpose, the conversion module 124 may obtain the UDDL stored in the user interaction data 128. For example, the conversion module 124 may be configured to convert the domain names enlisted in the UDDL into their respective IP addresses. Typically, in computer networks using internet protocol, all domain names are recognized by their respective IP addresses. Based on the IP address, data traffic is routed over the internet accordingly. In one implementation, the conversion module 124 may include an application for converting the domain names into a format recognizable by the HLR 110. Further, the conversion module 124 may be configured to save the converted domain names in a modified UDDL. The conversion module 124 may be provisioned to store the modified UDDL in the conversion data 130. Subsequently, the conversion module 124 may be configured to send a RAB assignment message containing the modified UDDL to the HLR 110 over an interface.

In one embodiment, the HLR 110 is responsible for managing network elements for providing QoS to user data in the communication network 104. In one implementation, the HLR 110 is configured to manage network elements, such as routers, gateways, and the like, based on the QoS profile associated with the communication device 102 for providing QoS to user data from the communication device 102. For example, for a communication device 102 having the class A QoS profile, the HLR 110 may manage the network resources accordingly in order to provide high bandwidth for all communications from the communication device 102. For the purpose, the HLR 110 performs the RAB assignment for configuring network elements. Upon completion of the RAB assignment, the user data from the communication device 102 is routed over the network according to the QoS profile of the communication device 102. QoS parameters, such as bandwidth, latency, and the like may be configured at the network elements for routing the user data accordingly.

In one implementation, the HLR 110 may be configured to perform the RAB assignment for the communication device 102 based on the modified UDDL received through the RAB assignment message from the DNS server 108. Subsequently, the HLR 110 configures the network elements, such as a router and a gateway, based on the domain names enlisted in the modified UDDL. As a result, the network elements are configured to provide dedicated QoS, using the allocated resources for the communication device 102, to the user data pertaining to the domain names enlisted in the modified UDDL, thereby ensuring a convenient browsing experience over these domain names. For example, the user data for a banking domain name enlisted in the modified UDDL may be provided dedicated QoS, thereby ensuring completion of transactions and averting any error during transactions over the banking website.

The present subject matter thus ensures that dedicated QoS for user data pertaining to the domain names enlisted in the UDDL is delivered, thereby ensuring a convenient browsing experience for the user. Further, the user is assured of completion of any service the user is availing over these domains, such as any banking transaction, gameplay over websites, and the like.

FIG. 2 illustrates a call-flow diagram indicating a procedure for prioritizing QoS for user applications in communication networks, in accordance with an embodiment of the present subject matter. The various arrow indicators used in the call-flow diagram depict the transfer of signal/information between the communication device 102, the DNS server 108, and the HLR 110. In many cases, multiple network entities besides those shown may lie between the entities, including transmitting stations, and switching stations, although those have been omitted for clarity. Similarly, various acknowledgement and confirmation network responses may also be omitted for clarity.

In one implementation, the process of prioritizing QoS for user applications is initiated with the communication device 102 sending a UDDL request message 252 to the DNS server 108. The UDDL request message 252 comprises of the UDDL. As described previously, the UDDL comprises of all the domain names which a user wishes to prioritize. In one implementation, the UDDL may include the domain names in an increasing/decreasing order of priority. For example, the user may enlist several banking domain names, stock exchange domain names, and other domain names of user's choice in UDDL. In one implementation, the user may send the UDDL through a communication device 102. In one implementation, initially the communication device 102 latches onto an access point of the communication network 104 for availing services provided by the service provider. Further, a firewall present in the system authenticates the communication device 102 by matching the identification credentials of the communication device 102, such as IMSI number, registration number, and the like with a database present in the authentication, authorization, and accounting (AAA) server. Further, conventional tunnel establishment procedure is performed and a tunnel is established for carrying user data. Subsequently, the UDDL request message 252 is sent to the DNS 108. In one implementation, the UDDL may be sent through as an SMS message. In another implementation, the user may send the UDDL through an e-mail to its service provider. In another implementation, the user may request to prioritize the domain names enlisted in the UDDL through a voice call.

In one implementation, the DNS server 108 is provisioned to store the UDDL request message 252. Further, the DNS server 108 may be configured to convert the domain names enlisted in the UDDL to a format recognizable by the HLR 110. In one implementation, the DNS server 108 converts the domain names enlisted in the UDDL to their respective IP addresses. Further, the DNS server 108 may enlist the converted domain names in a modified UDDL. Subsequently, the DNS server 108 transmits a RAB assignment message 254 comprising the modified UDDL to the HLR 110.

Typically, the HLR 110 is responsible for managing network elements for providing QoS in the communication network 104. The HLR 110 performs RAB assignment for managing the network elements according to a QoS profile corresponding to the communication device 102. In one implementation, the HLR 110 may be configured to manage network resources, such as routers, gateways, and the like based on the modified UDDL received via the RAB assignment message 254. Subsequently, the HLR 110 sends a RAB assignment acknowledgement message 256 to the DNS server 108, thereby indicating successful configuration of the network elements.

Upon successful exchange of these messages, the network elements are configured for prioritizing QoS for user data pertaining to the domain names specified in the UDDL, thereby ensuring convenient browsing experience for the user while availing services over these domains.

FIG. 3 illustrates an exemplary method 300 for prioritizing QoS for user applications in communication systems, according to an embodiment of the present subject matter. The order in which the method 300 is described is not intended to be construed as a limitation, and any number of the described method blocks can be combined in any order to implement the method 300, or an alternative method. Additionally, individual blocks may be deleted from the method without departing from the spirit and scope of the subject matter described herein. Furthermore, the method can be implemented in any suitable hardware, software, firmware, or combination thereof.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary method.

At block 302, a user defined domain list (UDDL) is created, where the UDDL comprises of domain names in order of priority which a user wishes to prioritize. In one implementation, the user may create the UDDL comprising domain names in descending order of priority. In another implementation, the user may divide the UDDL into three groups, i.e., high, medium, and low priority groups. The user may then enlist the domain names in these groups in the UDDL.

At block 304, a UDDL message containing the UDDL is sent to a domain name system (DNS) server. For example, as described previously, the communication device 102 sends the UDDL message to the DNS server 108. In one implementation, the UDDL message may be sent through an SMS message. In another implementation, the UDDL message may be sent through an e-mail. In yet another implementation, the user may wish to prioritize domain names enlisted in the UDDL through a voice call to its service provider.

At block 306, the UDDL is converted into a modified UDDL. In one implementation, the conversion module 124 may be configured to convert the domain names enlisted in the UDDL to a format recognizable by the HLR 110. Further, the conversion module 124 is provisioned to store the modified domain names in a modified UDDL.

At block 308, a radio access bearer (RAB) assignment message containing the modified UDDL is sent to a home location register (HLR). For example, the conversion module 124 may be configured to send the RAB assignment message to the HLR 110.

At block 310, configuration of network elements based on the modified UDDL is performed. In one implementation, the HLR 110 may be configured to configure the network elements, such as router, gateway, and the like for prioritizing QoS based on the modified UDDL. Upon completion of the configuration of the network elements, user data pertaining to the domain names enlisted in the modified UDDL are provided dedicated QoS, thereby ensuring convenient browsing experience for the user while availing services over these domains.

Although embodiments for methods and systems for prioritizing QoS for user applications in a communication network have been described in a language specific to structural features and/or methods, it is to be understood that the invention is not necessarily limited to the specific features or methods described. Rather, the specific features and methods are disclosed as exemplary embodiments for triggering user authentication in a communication network.

I claim:

1. A method for enabling prioritization of quality of service (QoS) of user applications relative to one another, the user applications being of a given user, the method comprising:
receiving a domain name list (DL) message, wherein the DL message includes a DL, the DL comprising one or more domain names associated with user applications of the given user and an associated prioritizing QoS for respective ones of the one or more domain names;
converting the one or more domain names specified in the DL to obtain a modified DL, wherein the modified DL includes the one or more domain names in a format recognizable by a home location register (HLR); and
sending a radio access bearer (RAB) assignment message including the modified DL to the HLR for prioritizing QoS for the user applications relative to one another.

2. The method as claimed in claim 1, wherein the DL comprises the one or more domain names enlisted in at least one of a high priority QoS group, medium priority QoS group, and low priority QoS group.

3. The method as claimed in claim 1, wherein the method further comprises storing the DL message.

4. The method as claimed in claim 1, wherein the receiving includes receiving the DL for a particular communication device; and wherein the sending includes sending the RAB message including the DL for prioritizing the QoS for the particular user applications of the particular communication device.

5. A domain name system server comprising:
a processor; and
a user interaction module coupled to the processor, the user interaction module configured to receive a domain name list (DL) message from a communication device, wherein the DL message contains a DL, the DL including one or more domain names associated with respective particular one or more user applications of the communication device and an associated prioritizing Quality of Service (QoS) for respective ones of the one or more domain names; and
a conversion module coupled to the processor, the conversion module configured to convert the DL to a modified DL, the modified DL including the one or more domain names in a format recognizable by a home location register;
wherein the conversion module is further configured to transmit a radio access bearer (RAB) assignment message, wherein the RAB assignment message includes the modified DL.

6. The domain name system server as claimed in claim 5, wherein the DL comprises the one or more domain names in a priority order.

7. The domain name system server as claimed in claim 5, wherein the user interaction module is further configured to store the DL.

8. The domain name system server as claimed in claim 5, wherein the conversion module is further configured to store the modified DL.

9. The domain name system server as claimed in claim 5, wherein the user interaction module is configured to receive the DL for one or more communication devices; and wherein the transmitting includes sending the RAB message including the DL for prioritizing the QoS for the user applications for the one or more communication devices.

10. A home location register comprising a processor and an associated memory, the processor configured to:
receive a radio access bearer (RAB) assignment message, wherein the RAB assignment message includes a modified domain name list (DL), and wherein the modified DL comprises one or more domain names associated with user applications of a given user and an associated prioritizing Quality of Service (QoS) for respective ones of the one or more domain names;
determine quality of service (QoS) for each of the one or more domain names provided in the modified DL based on the RAB assignment message;
configure a plurality of network resources for prioritizing the QoS based on the modified DL; and
send a RAB acknowledgement message to indicate successful configuration of the network resource.

11. A non-transitory computer-readable medium having embodied thereon a computer program for executing a method for prioritizing quality of service (QoS) of user applications relative to one another, the user applications being of a given user the method comprising:
receiving a domain name list (DL) message, wherein the DL message includes a DL comprising one or more domain names associated with the user applications of the given user and an associated prioritizing Quality of Service (QoS) for respective ones of the one or more domain names;
converting the one or more domain names specified in the DL to obtain a modified DL, wherein the modified DL includes the one or more domain names in a format recognizable by a home location register; and
sending a radio access bearer (RAB) assignment message including the modified DL to the HLR for prioritizing QoS for user applications.

\* \* \* \* \*